United States Patent [19]
Staudt et al.

[11] 3,841,111
[45] Oct. 15, 1974

[54] ELASTIC ROTARY COUPLING FOR A CENTRIFUGAL GOVERNOR OF AN RPM REGULATOR ASSOCIATED WITH AN INTERNAL COMBUSTION ENGINE

[75] Inventors: Heinrich Staudt, Markgroningen; Eberhard Hofmann, Kirchberg Murr; Ilija Djordjevic, Stuttgart-Vaihingen, all of Germany

[73] Assignee: Robert Bosch GmbH, Stuttgart, Germany; by said Staudt and Hofmann

[22] Filed: Jan. 31, 1973

[21] Appl. No.: 328,415

[30] Foreign Application Priority Data
Mar. 21, 1972 Germany.............................. 2213698

[52] U.S. Cl. .................... 64/27 NM, 64/14, 64/25, 73/526, 192/105 C, 123/140 R
[51] Int. Cl............................................... F16d 3/14
[58] Field of Search .......... 64/27 NM, 27 R, 14, 25, 64/6, 1 V; 123/140 R, 522; 73/526 X; 192/105 C

[56] References Cited
UNITED STATES PATENTS

| | | | |
|---|---|---|---|
| 2,660,421 | 11/1953 | Sorensen............................... | 73/522 |
| 2,660,422 | 11/1953 | Parker .................................. | 73/522 |
| 3,530,845 | 9/1970 | Staudt.............................. | 123/140 R |
| 3,577,968 | 5/1971 | Staudt............................ | 123/140 R |

Primary Examiner—Samuel Scott
Assistant Examiner—Randall Heald
Attorney, Agent, or Firm—Edwin E. Greigg

[57] ABSTRACT

In a centrifugal governor a primary or driving part is connected for torque transmission to a secondary or driven part by means of elastic coupling elements. The primary part comprises a drive shaft and a bowl-shaped housing affixed thereto, while the secondary part comprises a centrifugal weight carrier received in said housing. An internal cylindrical wall portion of the housing constitutes the external bearing for the centrifugal weight carrier. A peripheral cylindrical face of the centrifugal weight carrier cooperates with the internal cylindrical wall portion.

4 Claims, 3 Drawing Figures

PATENTED OCT 15 1974　　　　　　　　　　　3,841,111

ELASTIC ROTARY COUPLING FOR A CENTRIFUGAL GOVERNOR OF AN RPM REGULATOR ASSOCIATED WITH AN INTERNAL COMBUSTION ENGINE

BACKGROUND OF THE INVENTION

This invention relates to a coupling between a drive shaft and a centrifugal weight carrier of a centrifugal rpm regulator for internal combustion engines. The coupling is of the type that is provided with torque transmitting elastic coupling elements which are disposed symmetrically with respect to the drive shaft in a cage formed basically of a primary and a secondary component. The primary or driving component is fixedly attached to the drive shaft, while the secondary or driven component serves as the centrifugal weight carrier.

The purpose of an elastic coupling between the drive shaft and the centrifugal weight carrier is to dampen rotary oscillations generated at the driving side (for example, the cam shaft) of a fuel pump.

Known couplings of the aforeoutlined type have on the drive shaft either a bearing which has a very short axial length and is thus insufficient for high loads, or a bearing which is very long and therefore the coupling structure has to have substantial longitudinal dimensions.

OBJECT AND SUMMARY OF THE INVENTION

It is an object of the invention to provide an improved coupling which has a short structural length and yet is provided with a sufficiently strong, operationally safe and long-life bearing.

Briefly stated, according to the invention, there is provided a bowl-shaped housing which is connected with the drive shaft, and the cylindrical inner wall of which forms an external bearing face for the centrifugal weight carrier.

The invention will be better understood as well as further objects and advantages become more apparent from the ensuing detailed specification of two exemplary embodiments taken in conjunction with the drawing, wherein:

DESCRIPTION OF THE PREFERRED EMBODIMENTS

Figure 1:
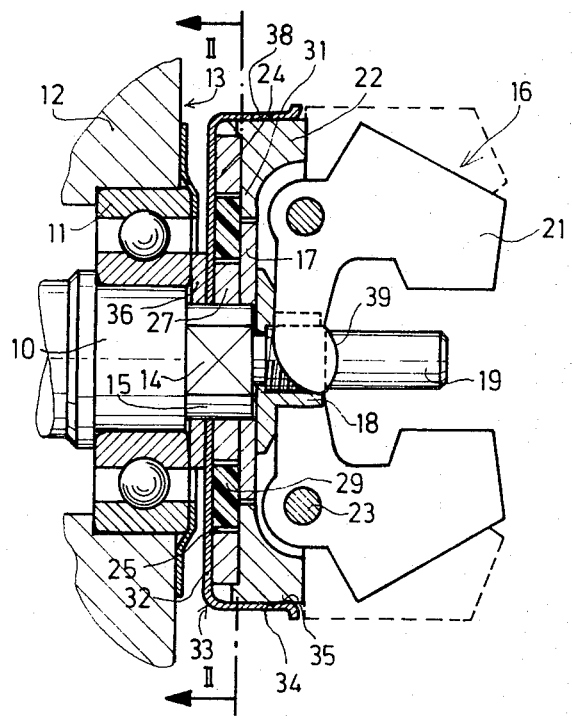
FIG. 1 is an axial sectional view of a first embodiment of the invention.

Turning now to FIG. 1, there is shown a cam shaft 10 which serves as a drive shaft and which is associated with a fuel injection pump 13 illustrated only in a fragmentary manner by its housing 12 and a bearing 11. On a portion 15 of the cam shaft 10 provided with driving faces 14 there is inserted a centrifugal governor 16 of a centrifugal rpm regulator, not shown in detail. The centrifugal governor 16 is axially tightened to the shaft 10 through an inserted closure disc 17 by a tensioning nut 18 which is threaded on a terminus 19 of the cam shaft 10 projecting into the centrifugal governor 16. The latter has a centrifugal weight carrier 22 in which there are pivotally supported two centrifugal weights 21 by means of pins 23. Each centrifugal weight 21 has an integral pressure arm 39 which exerts an rpm-dependent force on one or more governor springs (not shown) through an axially slidable governor member (also not shown) supported on the terminal portion 19 of the drive shaft 10.

Figure 2:
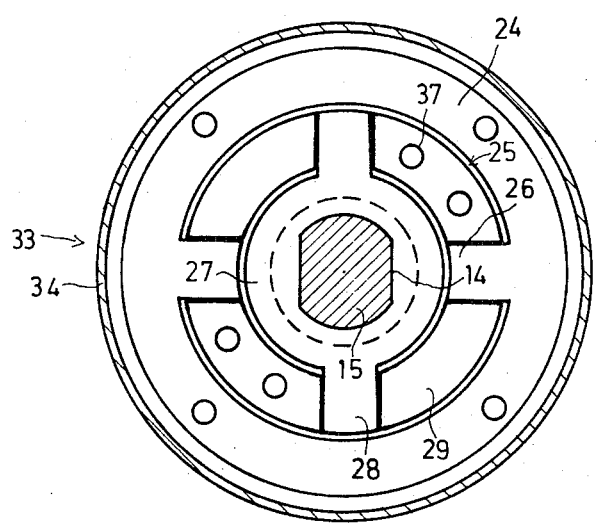
FIG. 2 is a section on line II—II of FIG. 1.

With the centrifugal weight carrier 22 there is fixedly connected an external driving component or disc 24 which, as it may be well observed in FIG. 2, has a pair of diametrically opposed driving lugs 26 projecting radially inwardly into a cage 25.

The cage 25 is formed of the intermediate space defined between the external drive component 24 and an inner drive component 27 inserted on the portion 15 of the cam shaft 10 and being rotationally fixedly attached thereto. The inner drive component or disc 27 has, similarly to the outer drive component 24, two drive lugs 28 projecting radially outwardly into the cage 25. The drive lugs 26 and 28 each form the lateral boundary for elastic coupling elements 29 which, in a known manner, have the shape of circular sectors and are made of an elastically yielding material, preferably rubber. In the axial direction the cage 25, together with its elastic coupling elements 29, is bounded on the one side by the closure disc 17 and a flange portion 31 of the centrifugal weight carrier 22 and, on the other side, by a wall 32 of a bowl-shaped housing 33. The wall 32 extends normal to the axis of the shaft 10.

The bowl-shaped housing 33 is, similarly to the inner drive component 27, connected in a form-locking manner with the portion 15 of the cam shaft 10 and has a cylindrical portion 34 which, with its internal running face 35 oriented towards the centrifugal weight carrier 32 forms an external slide bearing for the latter. The provision of the relatively shallow bowl-shaped housing 33 results in a particularly compact, space-saving structure of the entire coupling. Between the wall 32 of the bowl-shaped housing 33 and the inner race of the bearing 11 there is inserted a spacer disc 36.

Those components which serve as the primary or driving part of the coupling, such as the bowl-shaped housing 33, the inner drive component 27 and the closure disc 17 are axially securely tightened between the spacer disc 36 and the tightening nut 18 and thus form a rigid unit with the cam shaft 10. The secondary or driven part of the coupling is formed by the outer drive component 24 and the centrifugal weight carrier 22. The primary and secondary parts are coupled to one another by means of the elastic coupling elements 29 in such a manner that rotational oscillations generated at the driving side are dampened.

The elastic coupling elements 29 are, dependent upon the load thereon, disposed with greater or lesser bias in the cage 25. The dampening of rotational or tangential oscillations is achieved by causing a loss in the mechanical energy, in that during the deformation of the elastic coupling elements 29 which serve as dampening elements, one part of the mechanical energy is transformed into heat. This type of dampening of rotational oscillations is well known in the art.

A fine tuning of the dampening may be achieved either by selecting the proper material for the coupling elements 29 or by changing their outer dimensions or structural strength, for example, by means of holes 37, as shown in FIG. 2.

The outer bearing formed at the outermost circumference of the centrifugal governor 16 between the running face 35 of the housing 33 and the outer circumferential face of the centrifugal weight carrier 22 results in a superior guidance for the secondary part with respect to the primary part and has a specifically small load and further permits an efficient lubrication of the bearing faces. The bores 38 which are provided in the cylindrical portion 34 of the housing 33 permit in an advantageous manner an access to the lubricated portion in the outer bearing between the housing 33 and the centrifugal weight carrier 22.

It is a particular advantage of the aforedescribed structure that the enlarged bearing face between the primary and the secondary coupling parts does not result in an increase of the structural length of the centrifugal governor 16. Also, the particular securing of the primary and secondary parts to one another by means of the tightening nut 18 permits a simple and inexpensive manufacture and assembly of the coupling.

Figure 3:
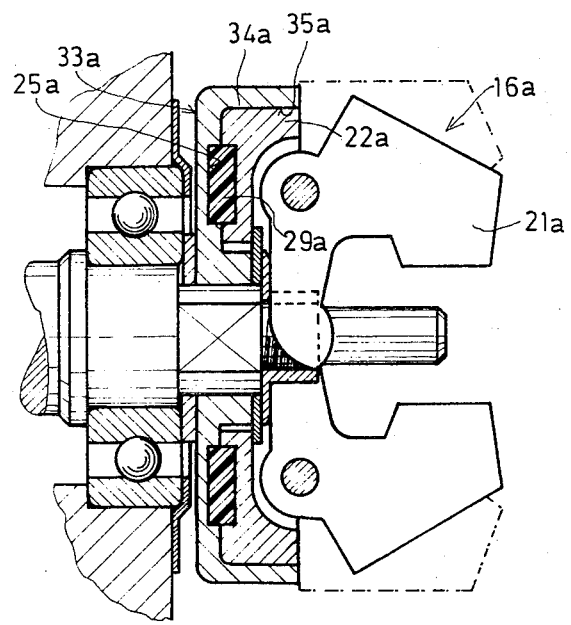
FIG. 3 is an axial sectional view of a second embodiment of the invention.

The second embodiment of the invention illustrated in FIG. 3 differs from the first embodiment illustrated in FIGS. 1 and 2 in substance only by differently structured, disposed and operating elastic coupling elements 29a disposed in the cage 25a. The cross section of the coupling elements 29a is approximately circular or oval. They are supported along about one half of their axial length by the primary part of the centrifugal governor 16a and along the other half by the secondary part. A bowl-shaped housing 33a formed as the primary part serves with its internal running face 35a provided on a cylindrical portion 34a as the external bearing for a centrifugal weight carrier 22a which, with its centrifugal weights 21a serves as the secondary part of the coupling.

What is claimed is:

1. In an elastic rotary coupling between a drive shaft and a centrifugal weight carrier of a centrifugal governor, said elastic rotary coupling being of the type that has (a) a primary or driving part affixed to said drive shaft, (b) a secondary or driven part including said centrifugal weight carrier, (c) a cage formed jointly by said driving and said driven parts, (d) elastic coupling elements disposed in said cage symmetrically with respect to said drive shaft, said elastic coupling elements transmitting the torque from said primary part to said secondary part, the improvement comprising a bowl-shaped housing forming part of said primary part and being secured to said drive shaft, said centrifugal weight carrier being received in said bowl-shaped housing, said bowl-shaped housing having a wall portion including an inner cylindrical running face, said inner cylindrical running face constituting an external bearing for said centrifugal weight carrier.

2. An improvement as defined in claim 1, wherein said cage is axially bounded on one side by said bowl-shaped housing and on the other side by said centrifugal weight carrier.

3. An improvement as defined in claim 1, including

A. an outer drive disc or ring radially bounding said cage and having first driving lugs extending radially inwardly into said cage and
B. an inner drive disc or ring radially bounding said cage and having second driving lugs extending radially outwardly into said cage, one of said driving rings forming part of said primary part and the other of said driving rings forming part of said secondary part, each said elastic coupling element being compressed between and laterally engaged by a first and a second driving lug.

4. An improvement as defined in claim 3, including

A. a tightening nut threadedly mounted on said drive shaft and
B. a closure disc inserted on said drive shaft; said bowl-shaped housing, said inner and outer driving rings and said centrifugal weight carrier being held together on said drive shaft by said nut through said closure disc.

* * * * *